Aug. 5, 1969   A. D. BORONKAY   3,459,481
SPECTROPHOTOMETER HAVING MAGNETIC SLIT-SERVO SYSTEM
Filed June 29, 1965
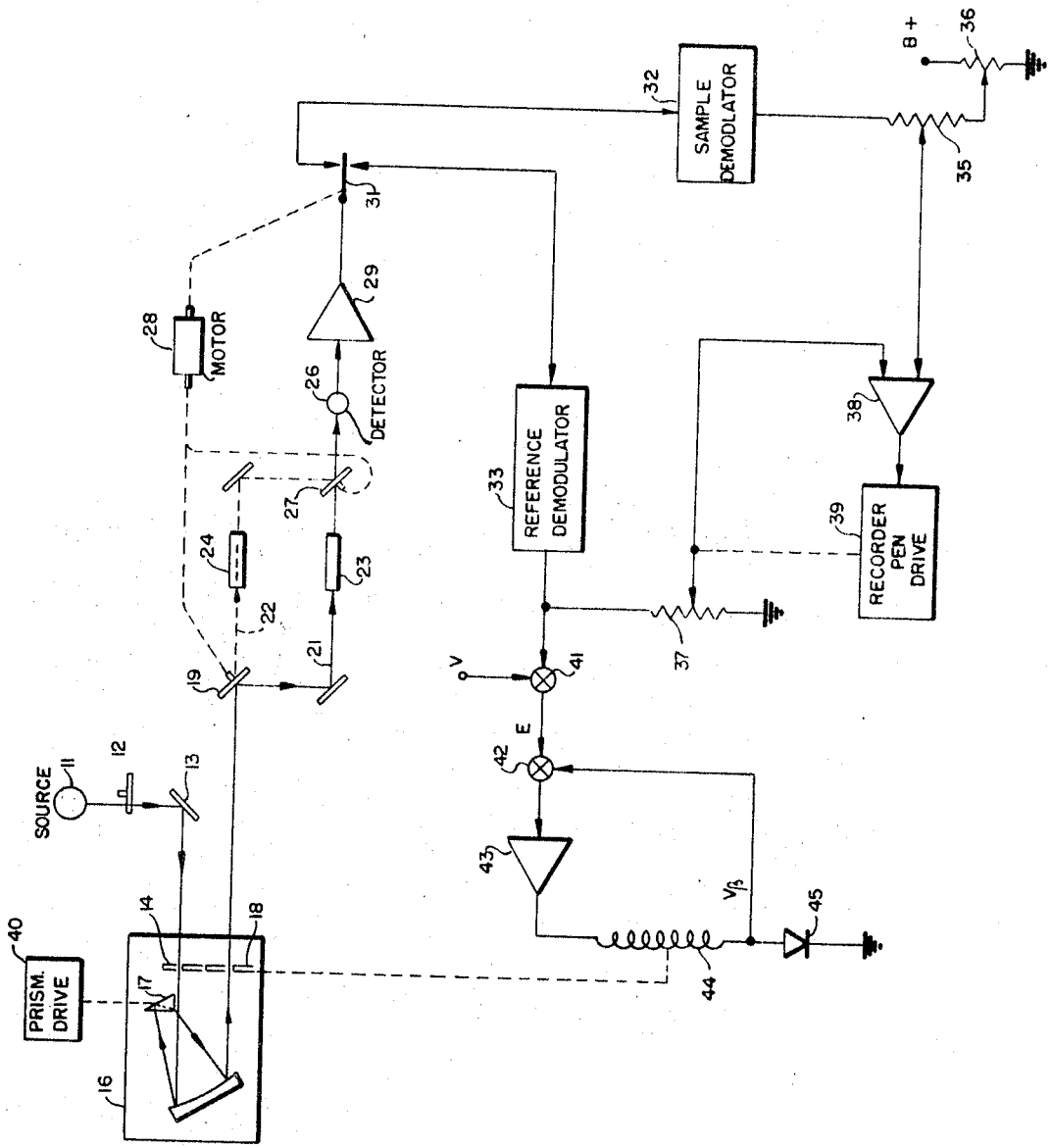
INVENTOR.
ATTILA D. BORONKAY
BY
ATTORNEY 3,459,481
SPECTROPHOTOMETER HAVING MAGNETIC
SLIT-SERVO SYSTEM
Attila Denes Boronkay, La Habra, Calif., assignor to
Beckman Instruments, Inc., a corporation of California
Filed June 29, 1965, Ser. No. 467,918
Int. Cl. G01j 3/42
U.S. Cl. 356—95                                    11 Claims

ABSTRACT OF THE DISCLOSURE

There is disclosed an improved slit servo system for use in optical double beam analyzers utilizing an electromagnetic drive for controlling the slit width of a monochromator. The improved slit servo system may be utilized with double beam radiant energy analyzers of either the ratio recording or optical null type. In such analyzers it is the usual practice to develop an electrical reference signal proportional to the radiant energy incident upon the sample and to utilize this signal in the slit control loop for varying the slit jaws of the monochromator in such a manner as to maintain this signal constant. This reference signal is compared with a source of fixed potential to develop a difference or error signal. The error signal is applied to one input of a comparator and after amplification utilized to energize the electromagnetic drive mechanism for the slits. A silicon diode is connected in series with the electromagnetic drive. The voltage developed across this element is a logarithmic function of the current therethrough and the voltage thereacross is fed back to the comparator such that the output of the comparator is the difference between the error voltage and the feedback voltage. The input to the electromagnetic drive is therefore a linear function of the width of the slit.

---

The present invention relates generally to optical analyzers of the double beam type and more particularly to a spectrophotometer having an improved slit-servo system which utilizes an electromagnetic drive for controlling the slit width of a monochromator.

Many double beam spectrophotometers develop electrical sample and reference signals which are utilized in various ways, most generally to determine the ratio of the radiant energy transmitted by the sample to the radiant energy incident upon the surface thereof or sample transmittance. In ratio recording systems it is the common practice to utilize a potentiometric recording system in which the reference signal is applied across the feedback or position potentiometer of the recorder and the sample signal applied at the input of the pen servo amplifier. The pen servo system then operates to control the pen and consequently position the feedback potentiometer to reduce the input signal to zero. In optical null systems a signal is developed which varies as a function of the difference in intensity of the reference and sample beams and this signal utilized to control an optical attenuator to reduce the difference to zero. The position of the optical attenuator is then a function of sample transmittance. In both systems it is desirable to maintain the energy in the reference and sample beams constant. This is generally accomplished by a secondary servo system utilized to drive the variable slit jaws of the monochromator. In this servo loop it sometimes is the practice to compare an electrical signal wtih a fixed potential to develop a difference or an error voltage which is utilized to drive the slit servo amplifier.

As is well known the intensity of the radiant energy signal passing a monochromator having only an entrance and exit slit is proportional to the square of the slit width. Depending upon the spectral characteristics of the radiant energy source, the detector and other optical parameters within the system the same radiant energy or electrical reference signal level may occur at any given slit width. This presents a fundamental problem in automatic control in that it is generally desirable to maintain the loop gain of any control servo loop constant for greatest stability. The loop gain of the slit servo loop may be defined as the percent slit width change per unit of driving or error signal. Thus, $$A = \frac{\frac{dw}{w}}{dE} \quad (1)$$

where A is the loop gain, w the slit width and E the driving or error signal.

From Equation 1

$$\frac{dw}{w} = A dE \quad (2)$$

which, after integration, yields $$E = \frac{1}{A} \log w \quad (3)$$

which is the desired slit control characteristic. From Equation 3 it is apparent that a logarithmic conversion must be introduced in the slit servo loop.

In the prior art systems in which the slit driving mechanism is a servo motor it has been the common practice to provide this logarithmic conversion by a log-shaped mechanical cam in the slit driving mechanism between the motor and the slit jaws. It has also been the practice in some systems to provide a log-potentiometer attenuator in the amplifier circuit which is driven synchronously with the slit mechanism. These servo loops are of the so called type 1 systems in that they operate to reduce the error signal to zero.

Some prior art systems have utilized electromagnetic drive mechanisms as slit actuators and have the inherent advantage of a response speed which is many times faster than that of the rotating servo. However, the logarithmic conversion in the form of the log-shaped mechanical cam or the log-potentiometer attenuator driven in synchronism with the slit mechanism are not practical conversion systems for use with the electromagnetic drive because of its high speed of response and in the prior art these systems have used a programmed slit width. In these systems the electromagnet drives the slit open against a spring and is of the type 0 servo loop in that the drive signal is a linear function of slit width, i.e., a continuous current is required to maintain the slit in an open position.

It is a principal object of the present invention to provide a double beam optical analyzer having a greatly simplified logarithmic slit-drive system.

It is also a principal object to provide an automatic slit control mechanism utilizing an electromagnetic drive for maintaining the reference signal in a spectrophotometer substantially constant.

Another object is to provide a logarithmic slit-drive system which contains no rotating elements, bearings or frictional sources for use in a radiant energy analyzer to maintain constant the background energy.

A further object is to provide an automatic electromagnetic slit control system for a double beam spectrophotometer which provides a linear relation between the driving signal to the slit actuating mechanism and the slit width.

Yet another object is the provision in a double beam spectrophotometer of an automatic slit control system consisting of a linear magnetic actuator in which a constant gain is maintained in the slit control servo loop.

Another object of the present invention is the provision of a double beam spectrophotometer in which there is provided an automatic slit control system having a linear magnetic actuator for controlling the width of the slit and a logarithmic feedback amplifier for driving the actuator.

Other objects and many of the attendant advantages of this invention will become more readily apparent to those skilled in the art to which the present invention pertains as the same becomes better understood by reference to the following detailed description when considered in connection with the accompanying drawing.

The single figure of the drawing illustrates schematically a preferred embodiment of a double beam ratio recording optical analyzer incorporatnig an automatic slit-control system constructed according to the teachings of this invention.

Referring now to the drawing the exemplary embodiment of the apparatus generally comprises a radiation source 11, a modulator or beam chopper 12 and a mirror 13 for directing the modulated beam through the entrance slit 14 of monochromator 16. The radiant energy is dispersed within the monochromator by any suitable dispersing element such as prism 17 and emerges from the monochromator through exit slit 18. The beam from the exit slit of the monochromator is directed to a rotating half mirror or beam splitter 19 which directs radiation alternately along a sample beam path 21 and a reference beam path 22 through sample and reference cells 23 and 24 respectively. The radiation passing the reference and sample beams is recombined and transmitted along a common path to detector 26 by a second rotating half mirror or beam re-combiner 27 driven in synchronism with rotating half mirror or beam splitter 16 by motor 28. Thus, reference and sample beam radiation signals each modulated by chopper 12 fall alternately on detector 26.

Detector 26 produces an electrical signal having an amplitude that is a function of the intensity of the instantaneous incident radiation. Thus the electrical output of the detector has a first component which is proportional to the radiant energy transmitted by the sample contained in sample cell 23 and a second component which is a function of the radiant energy transmitted by a reference material contained in reference cell 24. The electrical signal output of detector 26 after amplification by amplifier 29 is applied to the moving armature of commutator 31 which is driven in synchronism with rotating half mirrors 19 and 27 by motor 28. Commutator 31 acts as a demodulator or signal sorter and applies the component proportional to the sample beam intensity generally referred to as the sample signal to the sample demodulator 32 and alternately the component proportional to the reference beam intensity generally referred to as the reference signal to reference demodulator 33. Sample demodulator 32 and reference demodulator 33 operate to demodulate the respective signals and produce at their output a D.C. signal having an amplitude proportional to the sample and reference beam intensities respectively.

The sample signal is connected through potentiometer 35 and the movable contact of potentiometer 36 to a point of common potential, generally circuit ground. The reference signal is connected through potentiometer 37 to the point of common potential. The movable contacts of potentiometers 35 and 37 are connected to the inputs of differential amplifier 38 having its output connected to energize a recorder pen drive motor 39. The pen drive motor drives a marking pen of any suitable chart recorder, not shown, and is also connected to the movable contact of potentiometer 37 to provide a feedback to the differential amplifier 38. Potentiometer 37 may be the position potentiometer of the recorder. If the recorder chart is driven in synchronism with the wavelength drive 40 used to scan the dispersed spectrum past exit slit 18 the instrument, when operated in the double beam mode as thus far described, will provide a record of the ratio of the radiant energy transmitted by the sample to the energy incident thereon or sample transmittance as a function of wavelength. Potentiometer 35 provides for setting the 100% point on the ratio recording scale and potentiometer 36 provides for setting the zero point on this scale.

A slit servo loop which includes the entrance and exit slits 14 and 18, the reference beam path 22, detector 26, amplifier 29, the demodulator or signal sorter 31 and reference demodulator 33 is completed by a pair of summing junctions or comparators 41 and 42, amplifier 43, electromagnetic drive 44 and an element 45 which has an exponential voltage versus current characteristic. The entrance and exit slits are generally simultaneously actuated by the slit drive mechanism and may be positioned, in practice, one above the other rather than in side-by-side relation as illustrated in the drawing.

The reference signal is applied to one input of comparator 41 in which it is compared to a fixed potential V to form an error signal E. Comparator 41 may take the form of a summing junction if the reference signal and the fixed voltage are of different polarities or may be a demodulator similar to that utilized at 31 with the inputs applied to the fixed contacts and the output taken from the moving armature. In this case the output represents the difference between the voltages applied at the fixed contacts.

The error signal is applied to one input of comparator 42 and after amplification by amplifier 43 is utilized to energize electromagnetic drive 44. The slits are spring biased in a closed position and if the reference signal is smaller than the fixed voltage, the electromagnetic drive will open the slits against the spring tension to minimize the error voltage E.

In the electromagnetic drive the magnitude of the driving current $i$ is a function of the driving or error voltage E, the gain $K_{43}$ of amplifier 43 and the magnitude of $V_\beta$, the feedback voltage developed across element 45.

If element 45 is one in which the voltage developed across it is a logarithmic function of the current therethrough then the feedback voltage $V_\beta$ is $$V_\beta = k \log i \quad (4)$$

where $k$ is a constant.

Silicon dioxides have such a voltage-current characteristic and for most silicon diodes $$V_\beta = 0.1 \log 10^{-9} i \quad (5)$$

If the voltage across element 45 is fed back to comparator 42 the input to amplifier 43 is the difference between the error voltage E and the feedback voltage $V_\beta$ and the voltage across the driving coil of electromagnetic drive 44 is $$i \cdot r = K_{43} (E - V_\beta) \quad (6)$$

where $r$ is the resistance of the driving coil. Substituting Equation 5 in Equation 6 we have $$\frac{i \cdot r}{K_{43}} = E - 0.1 \log 10^{-9} i \quad (7)$$

and if the gain $K_{43}$ of amplifier 43 is made sufficiently high then $$E = 0.1 \log 10^{-9} i \quad (8)$$

If the gain of the amplifier is made sufficiently high and the element 45 has a truly exponential current-voltage characteristic, the circuit operates as an ideal logarithmic amplifier, performs the logarithmic conversion and the slit servo loop satisfies the conditions of Equation 3.

It is apparent that the logarithmic feedback amplifier in the slit control loop provides a means for providing the logarithmic conversion which is necessary from Equation 3 and which is compatible with the response speed of electromagnetic driving systems since there are no moving parts to provide inertia other than the slits. Although the invention has been described in connection with a ratio recording system it is to be understood that the invention is equally applicable to an optical null system or any other class of optical analyzer which develops a reference signal proportional to the intensity of the radiation incident upon the sample. Other elements having an exponential current versus voltage characteristic may be substituted for the silicon diode illustrated in the preferred embodiment and it should be understood that the embodiment is merely exemplary of the invention and that many variations and modifications thereof are apparent to and within the scope of those skilled in the art.

What is claimed is:

1. In a spectrophotometer of the type having reference and sample beam paths, means for directing radiation from a source through a monochromator to a detector alternately along said paths and means for measuring the intensity of the radiation passing said sample path, the improvement comprising:
   variable slit defining means positioned to control the radiant energy impinging upon said detector;
   electromagnetic drive means connected to vary said said defining means; and
   means connected between said electromagnetic drive means and the output of said detector for providing an input to said drive means that is a linear function of the width of said slit defining means.

2. In a spectrophotometer of the type having reference and sample beam paths, means for directing radiation from the source through a monochromator to a detector alternately along said paths and means for measuring the intensity of the radiation passing said sample path including means for developing a reference signal that varies as a function of the intensity of radiation incident upon a sample in said sample path, the improvement comprising:
   variable slit defining means positioned to control radiant energy impinging upon said detector;
   electromagnetic drive means connected to vary said slit defining means; and
   circuit means interconnecting said electromagnetic drive means and the output of said detector and responsive to said reference signal for controlling said slit defining means so as to maintain said reference signal substantially constant, said circuit means having an input to said electromagnetic drive means that is a linear function of the width of said slit defining means.

3. In a spectrophotometer of the type having reference and sample beam paths, means for directing radiation from a source through a monochromator to a detector alternately along said paths and means for measuring the spectral characteristic of a material in said sample path, the improvement comprising:
   variable slit defining means positioned to control the intensity of radiant energy impinging upon said detector;
   electromagnetic drive means connected to vary said slit defining means; and
   circuit means connected between said detector and said eletromagnetic means for maintaining the intensity of the radiation in said reference beam substantially constant, said circuit means including means for feeding back a voltage that is a logarithmic function of the current through said electromagnetic drive means whereby the voltage input to said drive means is a linear function of the width of said slit defining means.

4. In a spectrophotometer of the type having reference and sample beam paths, means for directing radiation from a source through a monochromator to a detector alternately along said paths, means for measuring a spectral characteristic of a material in said sample path including means for developing a reference signal that varies as a function of the intensity of radiation incident upon said sample material, the improvement comprising:
   variable slit defining means positioned to control the intensity of radiant energy impinging upon said detector;
   electromagnetic drive means connected to vary said slit defining means; and
   circuit means connected between said electromagnetic drive means and said detector and responsive to said reference signal for maintaining said reference beam substantially constant, said circuit means including means for developing a potential that is a logarithmic function of the current through said electromagnetic drive means and means for feeding back said potential in a negative feedback circuit.

5. In a spectrophotometer of the type having reference and sample beam paths, means for directing radiation from a source through a monochromator to a detector alternately along said paths, means for measuring a special characteristics of a sample in said sample beam path and having a reference signal that varies as a function of the intensity of radiation incident upon said sample, the improvement comprising:
   variable slit defining means positioned to control the intensity of radiant energy impinging upon said detector;
   a slit control servo circuit having said reference signal as its input and connected to control said variable slit defining means and including;
   a fixed reference potential;
   means comparing said reference signal and said fixed reference potential to develop an error signal;
   means having said error signal as its input for developing a second signal proportional to the reciprocal of the gain of said circuit times the log of the width of said slit defining means; and
   means connected to and controlling said slit width in response to said second signal.

6. In a spectrophotometer of the type having reference and sample beam paths, means for directing radiation from a source through a monochromator to a detector alternately along said paths, means for measuring a spectral characteristic of a sample in said sample path and producing a reference signal that varies as a function of the intensity of radiation incident upon said sample, the improvement comprising:
   variable slit defining means positioned to control radiant energy impinging upon said detector;
   electromagnetic drive means connected to vary said slit defining means;
   a reference potential;
   first comparison means connected to receive said reference signal and said reference potential and developing a first error signal;
   second comparison means having said error signal as an input;
   means connecting the output of said second comparison means to said electromagnetic drive means;
   means connected to said electromagnetic drive means for developing a voltage that is a logarithmic function of the current passing said drive means; and
   means for feeding back said logarithmic voltage to said comparison means whereby the output thereof is the difference between said error signal and said logarithmic voltage.

7. In a spectrophotometer of the type having sample and reference beam paths, means for directing radiation from a source through a monochromator to a detector alternately along said paths, said detector producing sample and reference signals porportional to the intensity of radiation passing said sample and reference beam paths, means for measuring the spectral characteristic of a material in said sample beam path, the improvement comprising:
   variable slit defining means positioned to control the radiant energy incident upon said detector;
   means connected to said detector and responsive to said reference signal for producing an error signal as a function of the deviation of said reference signal from a desired value;

a comparison means having a pair of inputs and an output;

means connecting said error signal to a first of said inputs;

electromagnetic drive means connected to vary said slit defining means;

means connecting the output of said comparison means to said electromagnetic drive means;

diode means connected in series circuit with said electromagnetic drive means; and means connecting the junction of said electromagnetic drive means and said diode means to the other of said inputs.

8. In a spectrophotometer of the type having reference and sample beam paths, means for directing radiation from a source through a monochromator to a detector alternately along said paths, said detector producing sample and reference signals proportional to the intensity of radiation passing said reference and sample beam paths, and means for measuring a spectral characteristic of a material in said sample beam path, the improvement comprising:

variable slit defining means positioned to control the radiant energy incident upon said detector;

means connected to said detector and responsive to said reference signal for producing an error signal as a function of the deviation of said reference signal from a desired value;

electromagnetic drive means connected to vary said slit defining means; and logarithmic amplifier means having its input connected to receive said error signal and its output connected to said electromagnetic drive means whereby the output potential of said logarithmic amplifier means is a linear function of the width of said slit defining means.

9. In a spectrophotometer of the type having reference and sample beam paths, means for directing radiation from a source through a monochromator to a detector alternately along said paths, said detector producing sample and reference signals proportional to the intensity of radiation passing said sample beam path and incident upon a sample in said sample beam path respectively, and means for measuring the spectral characteristic of a material in said sample beam path, the improvement comprising:

variable slit defining means positioned to control the radiant energy incident upon said detector;

means connected to said detector and responsive to said reference signal for producing an error signal as a function of the deviation of said reference signal from a desired value;

a comparison means having a pair of inputs and an output;

means connecting said error signal to a first of said inputs;

electromagnetic drive means connected to vary said slit defining means;

means connecting the output of said comparison means to said electromagnetic drive means;

means connected in series circuit with said electromagnetic drive means and developing a voltage that is a logarithmic function of the current passing therethrough; and means connecting the junction of said electromagnetic means and said last named means to the other of said inputs.

10. A spectrophotometer comprising:

a source of radiation;

a radiant energy detector;

monochromator means including a variable slit defining means and a wavelength selection means for scanning radiation of selected wavelength past said slit defining means;

means defining a beam path from said source through said monochromator to said detector; said means including means for directing radiation alternately along reference and sample beam paths whereby said detector output includes a reference signal proportional to the intensity of radiation incident upon the sample;

electromagnetic drive means connected to said slit defining means for varying the width of said slit defining means;

means connected to said detector and having an output proportional to said reference signal;

means interconnecting said last named means and said electromagnetic means and receiving at its input said reference signal, said means providing an input to said electromagnetic means that is a linear function of the width of said slit defining means.

11. The spectrophotometer according to claim 10 wherein:

said interconnecting means includes in series circuit with said electromagnetic drive means an element developing a voltage that is a logarithmic function of the current passing therethrough;

means responsive to said reference signal for producing an error signal that is a function of the deviation of said reference signal from a desired value; and means developing a signal that is the difference between the voltage across said element and said error signal and supplying said voltage to said electromagnetic drive means.

References Cited
UNITED STATES PATENTS

| | | |
|---|---|---|
| 3,014,401 | 12/1961 | Plesse et al. |
| 3,123,660 | 3/1946 | Matthews _____ 250—204 X |
| 3,160,697 | 12/1964 | Jacobs et al. |
| 3,242,796 | 3/1966 | Strickler. |

RONALD L. WIBERT, Primary Examiner

F. L. EVANS, Assistant Examiner

U.S. Cl. X.R.

350—271; 356—97

PO-1050
(5/69)

UNITED STATES PATENT OFFICE
CERTIFICATE OF CORRECTION

Patent No. 3,459,481  Dated August 5, 1969

Inventor(s) Attila Denes Boronkay

It is certified that error appears in the above-identified patent and that said Letters Patent are hereby corrected as shown below:

Column 6, line 61, after "said" insert --second--.

SIGNED AND
SEALED

OCT 28 1969

(SEAL)
Attest:

Edward M. Fletcher, Jr.
Attesting Officer

WILLIAM E. SCHUYLER, JR.
Commissioner of Patents